(12) United States Patent
Celik

(10) Patent No.: US 11,142,022 B2
(45) Date of Patent: Oct. 12, 2021

(54) SUPPORT STRUCTURE

(71) Applicant: The Goodyear Tire & Rubber Company, Akron, OH (US)

(72) Inventor: Ceyhan Celik, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 144 days.

(21) Appl. No.: 16/685,176

(22) Filed: Nov. 15, 2019

(65) Prior Publication Data

US 2021/0146719 A1     May 20, 2021

(51) Int. Cl.
| | |
|---|---|
| *B60C 7/24* | (2006.01) |
| *B60B 9/26* | (2006.01) |
| *B60C 7/14* | (2006.01) |
| *B60B 1/04* | (2006.01) |
| *B60B 1/02* | (2006.01) |

(52) U.S. Cl.
CPC .............. *B60C 7/24* (2013.01); *B60B 9/26* (2013.01); *B60C 7/146* (2021.08); *B60B 1/0207* (2013.01); *B60B 1/043* (2013.01)

(58) Field of Classification Search
CPC ......... B60B 1/0207; B60B 1/043; B60B 9/26; B60C 7/24; B60C 7/26; B60C 7/28; B60C 7/14; B60C 2007/146
See application file for complete search history.

(56) References Cited

U.S. PATENT DOCUMENTS

| | | | |
|---|---|---|---|
| 479,255 A | 7/1892 | Dunlop | |
| 482,175 A | 9/1892 | Hollafolla | |
| 1,002,003 A | 8/1911 | Simonson et al. | |
| 1,087,626 A * | 2/1914 | Allen | B60C 7/14 152/251 |
| 1,136,546 A * | 4/1915 | Markson | B60C 7/14 152/256 |
| 1,233,722 A | 7/1917 | Smith | |
| 1,389,285 A | 8/1921 | Althoff | |
| 1,451,517 A | 4/1923 | Smith | |
| 1,930,764 A | 10/1933 | Mallory | |
| 3,493,027 A | 2/1970 | Dewhirst et al. | |
| 4,226,273 A | 10/1980 | Long et al. | |
| 4,235,270 A | 11/1980 | Kahaner et al. | |
| 4,602,823 A | 7/1986 | Berg | |
| 4,798,418 A | 1/1989 | Kempf et al. | |
| 5,343,916 A | 9/1994 | Duddey et al. | |
| 5,800,643 A | 9/1998 | Frankowski | |
| 6,068,721 A | 5/2000 | Dyer et al. | |
| 6,170,544 B1 * | 1/2001 | Hottebart | B60B 9/26 152/11 |

(Continued)

FOREIGN PATENT DOCUMENTS

WO     2017117598     7/2017

*Primary Examiner* — Kip T Kotter

(74) *Attorney, Agent, or Firm* — Robert N. Lipcsik

(57) ABSTRACT

A wheel assembly includes a mounting plate for attachment to a rotatable axle; a plurality of friction plates each engaging one of a plurality of parts of a tire assembly; and a plurality of cable members each connecting the mounting plate to the tire assembly such that each cable member extends radially outward through a first hole in one of the friction plates and radially inward through a second hole in the one friction plate to form a loop about the one friction plate and the one part of the plurality of parts of the tire assembly.

18 Claims, 5 Drawing Sheets

(56) References Cited

U.S. PATENT DOCUMENTS

| | | |
|---|---|---|
| 6,260,598 B1 | 7/2001 | Tanaka |
| 6,286,572 B1 | 9/2001 | Chen |
| 7,032,634 B2 | 4/2006 | Laurent et al. |
| 8,962,120 B2 | 2/2015 | Delfino et al. |
| 8,978,726 B2 | 3/2015 | Hutchinson |
| 9,387,726 B2 | 7/2016 | Choi et al. |
| 10,040,317 B2 | 8/2018 | Celik |
| 10,150,334 B2 | 12/2018 | Celik |
| 10,207,544 B2 | 2/2019 | Celik |
| 10,286,725 B2 | 5/2019 | Celik et al. |
| 10,406,852 B2 | 9/2019 | Celik et al. |
| 10,421,319 B2 | 9/2019 | Gaylo et al. |
| 10,449,805 B2 | 10/2019 | Shoji |
| 2003/0201043 A1 | 10/2003 | Adams et al. |
| 2004/0012246 A1* | 1/2004 | Rhyne ............... B60B 1/042 301/55 |
| 2004/0069385 A1 | 4/2004 | Timoney et al. |
| 2006/0144488 A1 | 7/2006 | Vannan |
| 2010/0193097 A1 | 8/2010 | McNier et al. |
| 2011/0272254 A1* | 11/2011 | Anderfaas ............ B60C 7/10 198/780 |
| 2012/0205017 A1 | 8/2012 | Endicott |
| 2014/0083581 A1 | 3/2014 | Schaedler et al. |
| 2016/0214435 A1 | 7/2016 | Schaedler et al. |
| 2017/0087930 A1 | 3/2017 | Mcmaster et al. |
| 2017/0087931 A1 | 3/2017 | Gaylo et al. |
| 2017/0326915 A1* | 11/2017 | Son .................... B60C 7/10 |
| 2018/0001704 A1 | 1/2018 | Reinhardt |

\* cited by examiner

SUPPORT STRUCTURE

FIELD OF INVENTION

The present invention relates to wheel/tire assemblies, and more particularly, to non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires are limited. It is an object of the present invention to overcome this limitation and increase the load carrying capacity and durability of these spokes and hence the performance of the top loader non-pneumatic tire.

SUMMARY OF THE INVENTION

A wheel assembly in accordance with the present invention includes a mounting plate for attachment to a rotatable axle; a plurality of friction plates each engaging one of a plurality of parts of a tire assembly; and a plurality of cable members each connecting the mounting plate to the tire assembly such that each cable member extends radially outward through a first hole in one of the friction plates and radially inward through a second hole in the one friction 'plate to form a loop about the one friction plate and the one part of the plurality of parts of the tire assembly.

According to another aspect of the wheel assembly, each cable member extends from each second hole of a corresponding friction plate axially adjacent a radially inner side of the corresponding friction plate.

According to still another aspect of the wheel assembly, each cable member extends from each second hole of a corresponding friction plate radially inward toward a second mounting plate secured to the first mounting plate.

According to yet another aspect of the wheel assembly, each cable member of the plurality of cable members and each friction plate of the plurality of friction plates cooperate with each other to engage the one part of the tire assembly in a mechanically interlocking arrangement.

According to still another aspect of the wheel assembly, each cable member of the plurality of cable members extends radially away from the mounting plate.

According to yet another aspect of the wheel assembly, each cable member extends of the plurality of cable members from each second hole of a corresponding friction plate to converge on that same cable member.

According to still another aspect of the wheel assembly, each cable member of the plurality of cable members extends from each second hole of a corresponding friction plate to that same cable member such that each cable member is fixed to itself.

According to yet another aspect of the wheel assembly, one part of each cable member is fixed to another part of each same cable member by welding.

According to still another aspect of the wheel assembly, one part of each cable member is fixed to another part of each same cable member by an adhesive.

According to yet another aspect of the wheel assembly, one part of each cable member is fixed to another part of each same cable member by fusing the parts together.

A first method in accordance with the present invention rotationally secures a wheel assembly to a tire assembly. The method includes the steps of: extending each cable member of a plurality of cable members radially away from a central plate; extending each cable member of the plurality of cable members radially through a first through-hole in a first end portion of each friction plate of a plurality of friction plates; radially and axially curving each cable member of the plurality of cable members back toward the central plate; extending each cable member of the plurality of cable members radially through a second through-hole in a second end portion of each friction plate of the plurality of friction plates; extending each cable member of the plurality of cable members axially along a radially bottom portion of each friction plate of the plurality of friction plates; extending each cable member of the plurality of cable members to converge on another part of each cable member of the plurality of cable members at an intersection; and securing each cable member of the plurality of cable members to itself at the intersection.

According to another aspect of the first method, the securing step includes fusing each cable member of the plurality of cable members to itself.

According to still another aspect of the first method, the securing step includes molding.

According to yet another aspect of the first method, the securing step includes bolting.

According to still another aspect of the first method, the securing step includes clamping.

A second method in accordance with the present invention rotationally secures a wheel assembly to a tire assembly. The method includes the steps of: extending each cable member of a plurality of cable members radially away a first central plate; extending each cable member of the plurality of cable members radially through a first end portion of each friction plate of a plurality of friction plates; curving each cable member of the plurality of cable members radially and axially back toward a second central plate; and extending each cable member of the plurality of cable members radially through a second end portion of each friction plate of the plurality of friction plates.

According to another aspect of the second method, a further step secures each cable member of the plurality of cable members to a second central plate.

According to still another aspect of the second method, a further secures each cable member of the plurality of cable members to itself.

According to yet another aspect of the second method, a further step molds one part of each cable member of the plurality of cable members to another part of each same cable member of the plurality of cable members.

According to still another aspect of the second method, further steps include securing each cable member of the plurality of cable members to a second central plate; and securing the first central plate to the second central plate.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

As shown in FIGS. 1-5, an example tire assembly 140, for use with the present invention, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The tire assembly 140 may have an outer flexible ring 142, which may include a shear band and tread structure, mounted on the inner central rim by a continuous cord/fabric reinforced spoke structure 110 extending between a rim and the outer ring 142.

The spoke structure 110 may define a plurality of cavities disposed concentrically about the rim allowing the spoke structure to deflect under load thereby defining a suitable balance between flexibility for ride comfort and traction within a footprint of the assembly 140 and stiffness for vehicle handling, low rolling resistance, and low heat build-up within the spoke structure 110. The spoke structure 110 may engage portions of the rim in a mechanical interlocking arrangement. The rim may further include plates that, along with portions of the rim may sandwich portions of the spoke structure 110 and create a further frictional and/or adhesive securement between the rim and the spoke structure. The spoke structure 110 may comprise a homogenous or heterogeneous polymer and/or a filled polymer.

Figure 1:
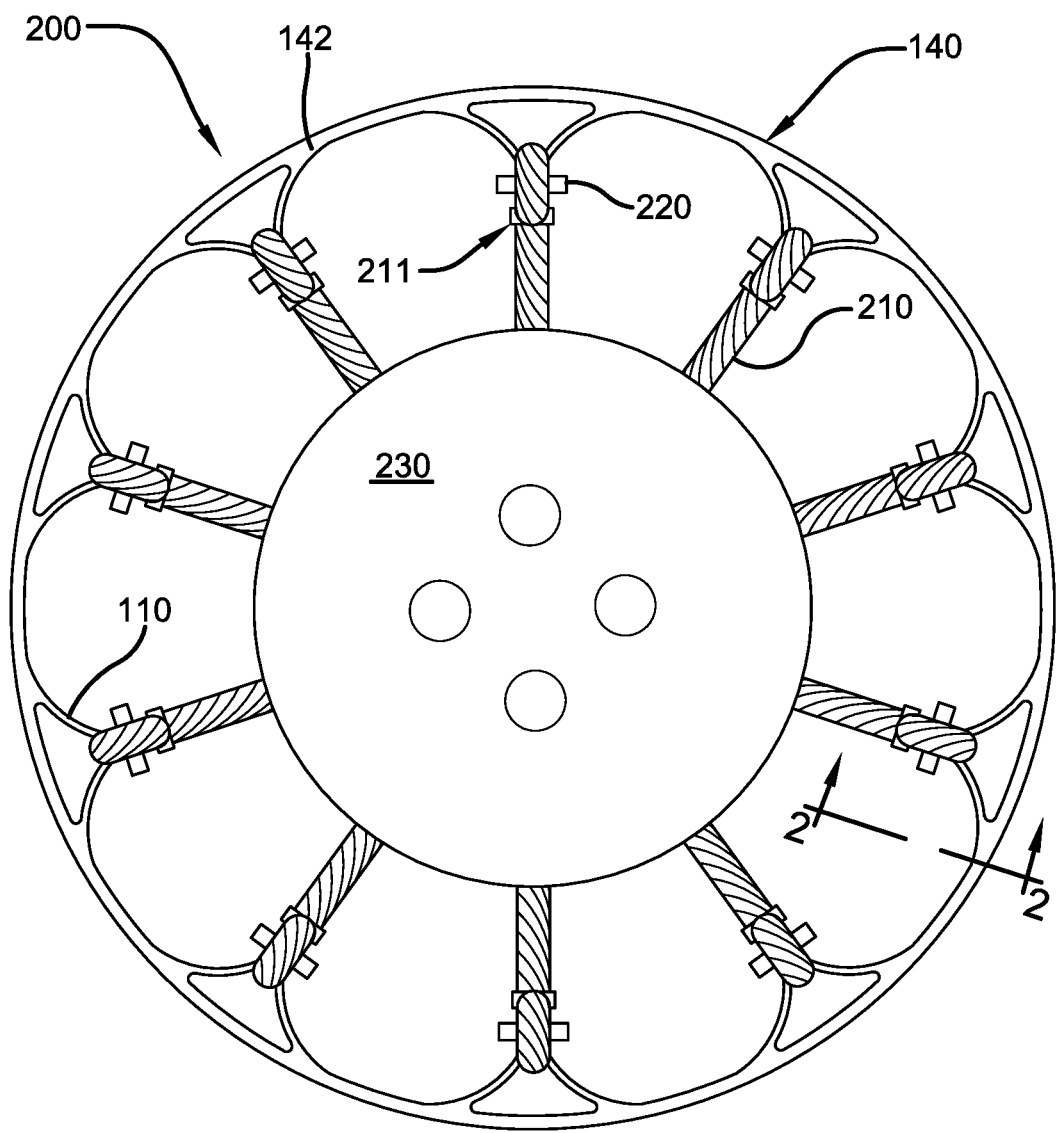
FIG. 1 is a schematic side view of an example wheel assembly in accordance with the present invention and an example tire assembly.
Figure 2:
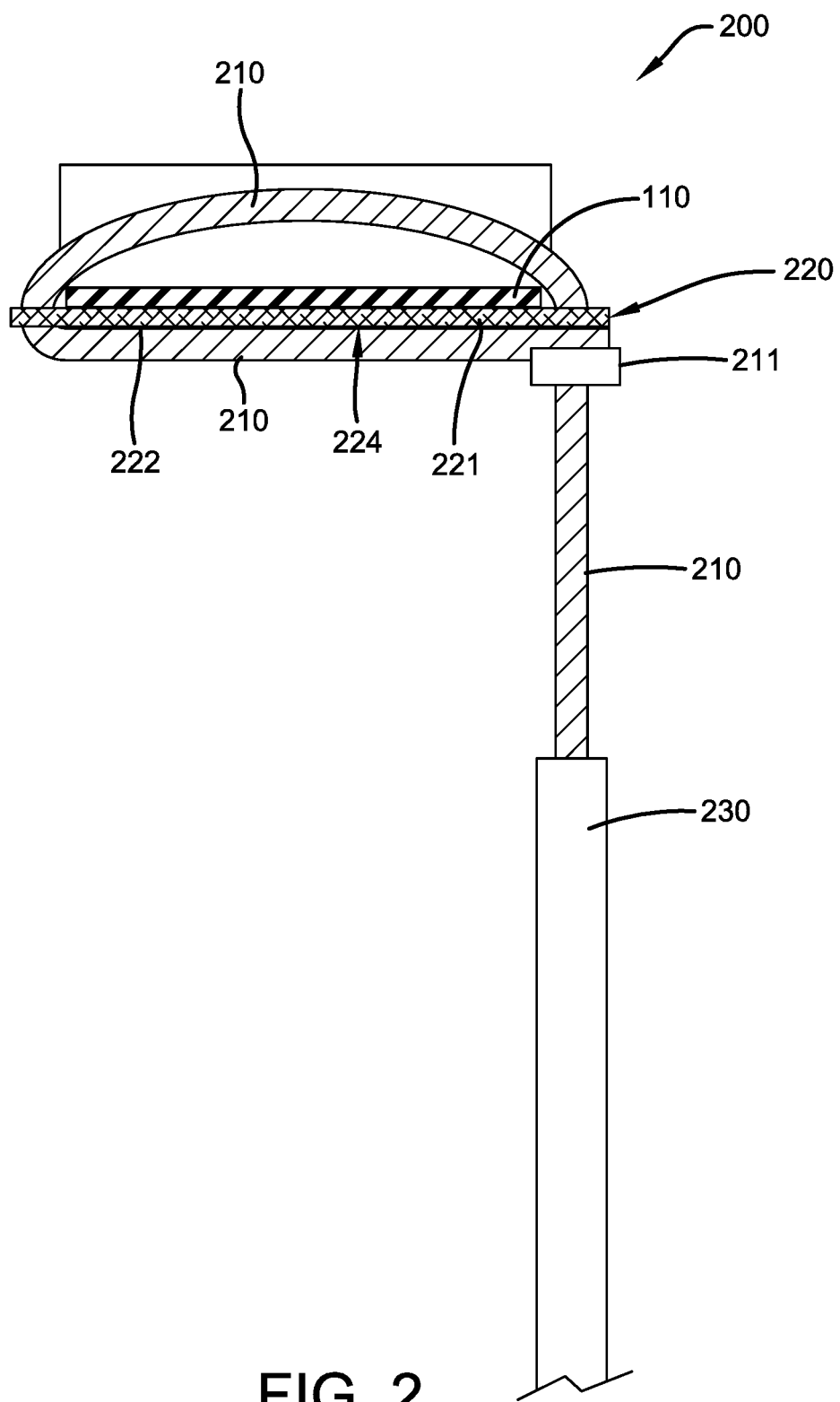
FIG. 2 is a schematic circumferential view of part of the wheel assembly of FIG. 1 taken along line '2-2' in FIG. 1.
Figure 3:
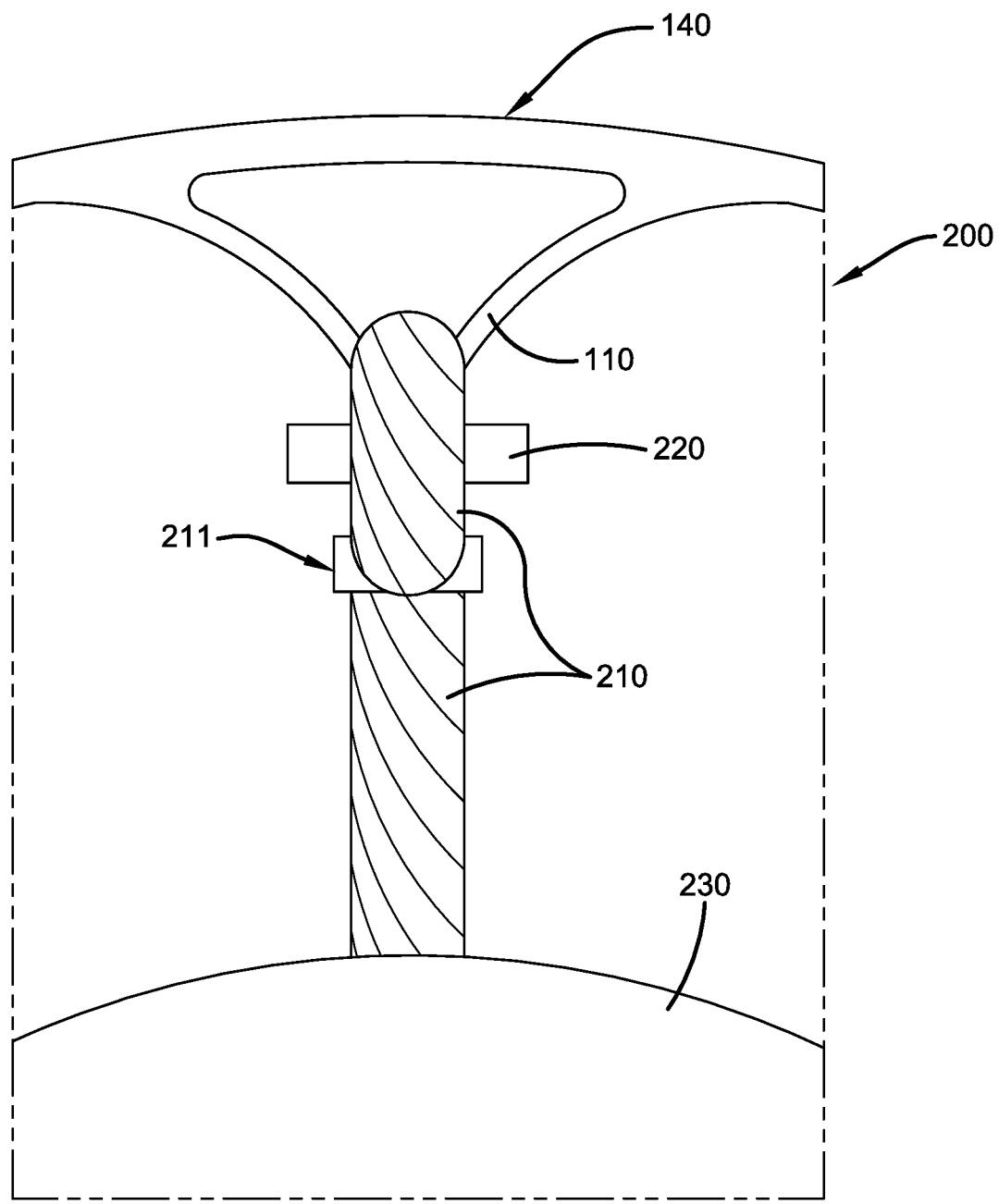
FIG. 3 is a schematic detail view of part of the wheel assembly of FIG. 1.

FIGS. 1-3 show a wheel assembly 200 in accordance with the present invention for use with pneumatic and/or non-pneumatic tire assemblies, such as the assembly 140. The wheel assembly 200 may include a plurality of cable members 210 (10 shown) for attachment to a rotatable axle or similar structure (not shown), a plurality of friction plates 220 for engaging each corresponding cable member 210 and an individual part of the spoke structure 110 of the tire assembly 140. The cable members 210 may be radially secured to a central plate 230 for attaching the wheel assembly 200 to a vehicle (not shown). The cable members 210 and friction plates 220 may cooperate with each other to engage the individual parts of the spoke structure 110 of the tire 140 in a mechanically interlocking arrangement (FIG. 2).

The friction plates 220 may each have a first axial end portion 221 and an opposite second axial end portion 222. Each end portion 221, 222 may have radial through-holes through which one of the cable members 210 may be inserted to form a single loop about a single friction plate 220 and a part of the spoke structure 110 (FIG. 2). Each cable member 210 may extend radially away from the central plate 230, radially through a through-hole in the first end portion 221 of the friction plate 220, curve radially and axially back toward the central plate 230, radially through a through-hole in the second end portion 222 of the friction plate 220, and axially along a radially bottom portion 224 of the friction plate 220, to an intersection 211 with itself. The intersection 211 may be fixed by any suitable manner (e.g., welding, molding, fusing, gluing, bolting to mounting tabs (not shown), clamping, and/or other suitably robust methods).

Figure 4:
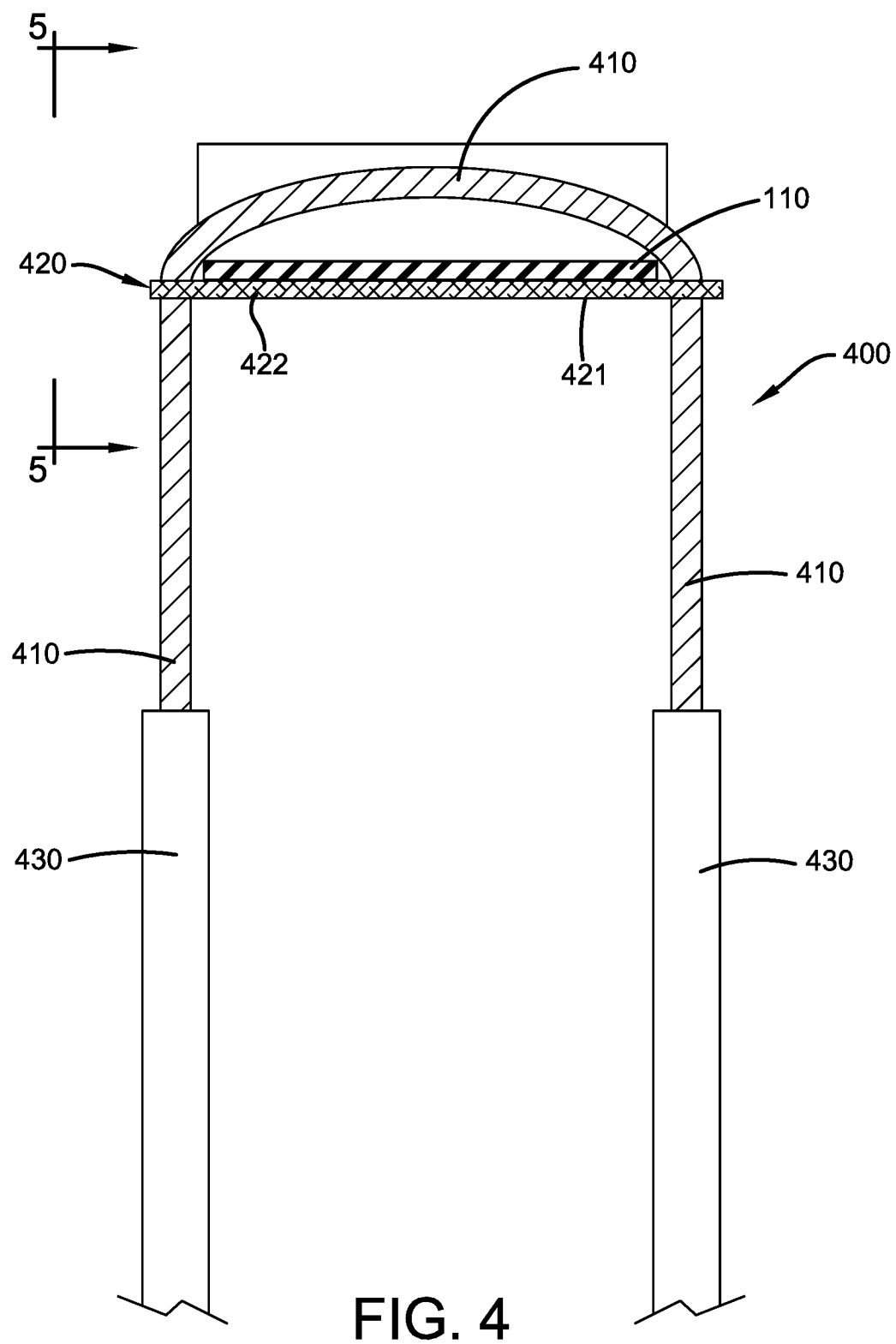
FIG. 4 is a schematic circumferential view of part of a second alternative wheel assembly in accordance with the present invention, similar to FIG. 2.
Figure 5:
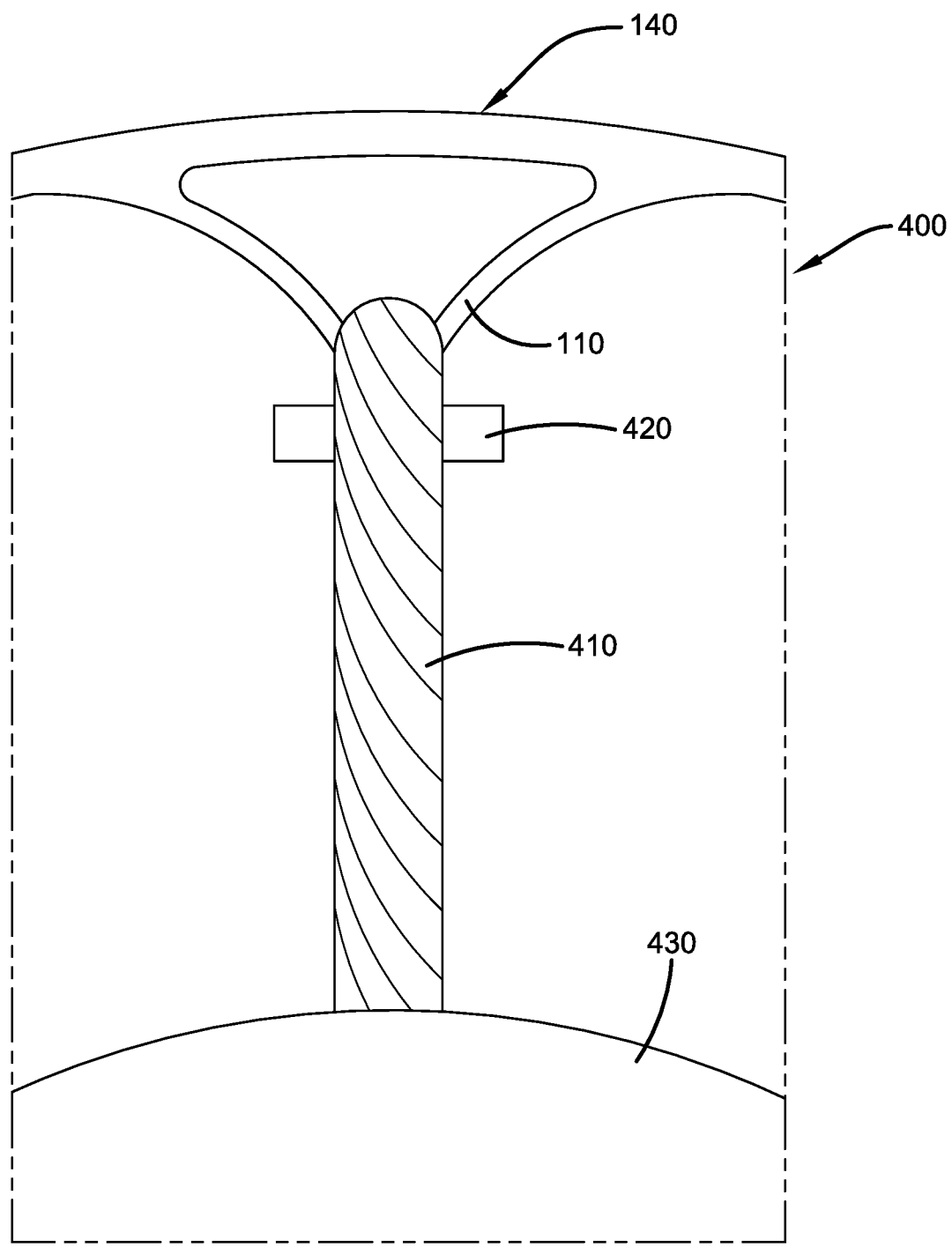
FIG. 5 is a schematic sectional view of part of the second alternative wheel assembly taken along line '5-5' in FIG. 4.

FIGS. 1 & 5 show another alternative wheel assembly 400 in accordance with the present invention for use with pneumatic and/or non-pneumatic tire assemblies, such as the assembly 140. The wheel assembly 400 may be of similar construction as shown in FIG. 1 except for the differences described below. The wheel assembly 400 may include a plurality of cable members 410 (one shown in FIGS. 4-5) for attachment to a rotatable axle or similar structure (not shown), a plurality of friction plates 420 for twice engaging each corresponding cable member 410 and an individual part of the spoke structure 110 of the tire assembly 140. The cable members 210 may be twice radially secured to central plates 430 for attaching the wheel assembly 400 to a vehicle (not shown). The cable members 410 and friction plates 420 may cooperate with each other to engage the individual parts of the spoke structure 110 of the tire 140 in a mechanically interlocking arrangement (FIG. 4).

The friction plates 420 may each have a first axial end portion 421 and an opposite second axial end portion 422. Each end portion 421, 422 may have radial through-holes through which one of the cable members 410 may be inserted to form a single loop about a single friction plate 220 and a part of the spoke structure 110 (FIG. 4). Each cable member 410 may extend radially away from one of the central plates 430, radially through a through-hole in the first end portion 421 of the friction plate 420, curve radially and axially back toward the central plates 430, radially through a through-hole in the second end portion 422 of the friction plate 420, and radially inward to the other of the central plates 430. The central plates 430 may be part of a single rim for attachment to a vehicle (not shown). The cable members 210, 410 may be coated flexible steel wire fastened to the central plates 230, 430.

Variations in the present invention are possible in light of the description of it provided herein. While certain representative examples and details have been shown for the purpose of illustrating the subject invention, it will be apparent to those skilled in this art that various changes and modifications can be made therein without departing from the scope of the subject invention. It is, therefore, to be understood that changes can be made in the particular examples described which will be within the full scope of the present invention as defined by the following appended claims. Further, the present invention is not limited to the examples hereinbefore described which may be varied in both construction and detail within the full scope of the appended claims.

What is claimed:

1. A wheel assembly comprising:
   a mounting plate for attachment to a rotatable axle;
   a plurality of friction plates each engaging one part of a plurality of parts of a tire assembly; and
   a plurality of cable members each connecting the mounting plate to the tire assembly such that each cable member extends radially outward through a first hole in one of the friction plates and radially inward through a second hole in the one friction plate to form a loop about the one friction plate and one part of the plurality of parts of the tire assembly.

2. The wheel assembly as set forth in claim 1 wherein each cable member extends from each second hole of a corresponding friction plate axially adjacent a radially inner side of the corresponding friction plate.

3. The wheel assembly as set forth in claim 1 wherein the cable members and friction plates cooperate with each other to engage the one part of the tire assembly in a mechanically interlocking arrangement.

4. The wheel assembly as set forth in claim 1 wherein each cable member extends radially away from the mounting plate.

5. The wheel assembly as set forth in claim 1 wherein each cable member extends from each second hole of a corresponding friction plate to converge on that same cable member.

6. The wheel assembly as set forth in claim 1 wherein each cable member extends from each second hole of a corresponding friction plate to that same cable member such that each cable member is fixed to itself.

7. The wheel assembly as set forth in claim 1 wherein one part of each cable member is fixed to another part of each cable member by welding.

8. The wheel assembly as set forth in claim 1 wherein one part of each cable member is fixed to another part of each cable member by an adhesive.

9. The wheel assembly as set forth in claim 1 wherein one part of each cable member is fixed to another part of each cable member by fusing the parts together.

10. A method for rotationally securing a wheel assembly to a tire assembly, the method comprising the steps of:
    extending each cable member of a plurality of cable members radially away from a central plate;
    extending each cable member of the plurality of cable members radially through a first through-hole in a first end portion of each friction plate of a plurality of friction plates;
    radially and axially curving each cable member of the plurality of cable members back toward the central plate;
    extending each cable member of the plurality of cable members radially through a second through-hole in a second end portion of each friction plate of the plurality of friction plates;
    extending each cable member of the plurality of cable members axially along a radially bottom portion of each friction plate of the plurality of friction plates;
    extending each cable member of the plurality of cable members to converge on another part of each cable member of the plurality of cable members at an intersection; and
    securing each cable member of the plurality of cable members to itself at the intersection.

11. The method as set forth in claim 10 wherein the securing step includes fusing each cable member of the plurality of cable members to itself.

12. The method as set forth in claim 10 wherein the securing step includes molding.

13. The method as set forth in claim 10 wherein the securing step includes bolting.

14. The method as set forth in claim 10 wherein the securing step includes clamping.

15. A method for rotationally securing a wheel assembly to a tire assembly, the method comprising the steps of:
    extending each cable member of a plurality of cable members radially away from a first central plate;
    extending each cable member of the plurality of cable members radially through a first end portion of each friction plate of a plurality of friction plates;
    curving each cable member of the plurality of cable members radially and axially back toward a second central plate; and
    extending each cable member of the plurality of cable members radially through a second end portion of each friction plate of the plurality of friction plates.

16. The method as set forth in claim 15 further including the step of securing each cable member of the plurality of cable members to a second central plate.

17. The method as set forth in claim 15 further including the step of securing each cable member of the plurality of cable members to itself.

18. The method as set forth in claim 15 further including the step of molding one part of each cable member of the plurality of cable members to another part of each same cable member of the plurality of cable members.

* * * * *